(12) United States Patent
Saitoh (10) Patent No.: US 7,904,127 B2
(45) Date of Patent: Mar. 8, 2011

(54) PORTABLE TERMINAL

(75) Inventor: Toshiaki Saitoh, Miyagi (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 12/158,518

(22) PCT Filed: Nov. 30, 2006

(86) PCT No.: PCT/JP2006/324013
§ 371 (c)(1),
(2), (4) Date: Jun. 20, 2008

(87) PCT Pub. No.: WO2007/072669
PCT Pub. Date: Jun. 28, 2007

(65) Prior Publication Data
US 2009/0298560 A1    Dec. 3, 2009

(30) Foreign Application Priority Data

Dec. 22, 2005  (JP) .................................. 2005-370614

(51) Int. Cl.
*H04B 1/38* (2006.01)
(52) U.S. Cl. ................ 455/575.4; 455/575.1; 455/575.3; 455/575.8
(58) Field of Classification Search ............... 455/575.1, 455/575.3, 575.4, 575.8
See application file for complete search history.

(56) References Cited

U.S. PATENT DOCUMENTS

| | | | |
|---|---|---|---|
| 2005/0113154 A1* | 5/2005 | Park et al. ................ | 455/575.4 |
| 2006/0025184 A1* | 2/2006 | Cho et al. ................ | 455/575.4 |
| 2007/0060220 A1* | 3/2007 | Hsu ............................. | 455/575.4 |

FOREIGN PATENT DOCUMENTS

| | | |
|---|---|---|
| JP | 08-063259 | 3/1996 |
| JP | 10-124214 | 5/1998 |
| JP | 2004-320549 | 11/2004 |
| JP | 2005-149470 | 6/2005 |
| JP | 2006-019925 | 1/2006 |

OTHER PUBLICATIONS

International Search Report Dated Dec. 26, 2006.

* cited by examiner

*Primary Examiner* — Tuan A Pham
(74) *Attorney, Agent, or Firm* — Seed IP Law Group PLLC (57) ABSTRACT

A slide type portable terminal is provided which can suppress a play, and can secure a predetermined strength, while the play may be easily produced between a portable condition and an extended condition of the slide type portable terminal by a coupling portion having a plurality of rails and a plurality of engaging portions Further, the respective rails are not exposed under swing condition of the slide type portable terminal.

A portable terminal 10 is equipped with a coupling portion 30 which couples an upper housing 11 to a lower housing 12 and guides an operation condition thereof from the portable condition up to the extended condition; and a swing device 40 which relatively rotates the upper housing 11 and the lower housing 12. A coupling portion 30 contains a first rail 31 and a second rail 32, which are provided on a front face 12A of the lower housing 12; and contains a first engaging portion 33 and a second engaging portion 34, which are provided on a back face 11B of the upper housing 11. After the swing device 40 has released an engagement of the first engaging portion 33 with respect to the first rail 31, the swing device 40 relatively rotates both the upper housing 11 and the lower housing 12 by setting the second engaging portion 34 as a center so as to engage the first engaging portion 33 to the second rail 32.

3 Claims, 8 Drawing Sheets

PORTABLE TERMINAL

TECHNICAL FIELD

The present invention is related to a portable terminal which is brought into an extended condition thereof, since an upper housing and a lower housing stacked on the upper housing are relatively moved to each other along a planar direction of the upper and lower housings.

BACKGROUND ART

Conventionally, among slide type portable terminals which are brought into extended conditions thereof by relatively moving upper housings and lower housings stacked via coupling portions on the upper housings along planar directions thereof, the below-mentioned portable terminal has been proposed (refer to, for instance, patent publication 1): That is, while a line along a stacking direction of an upper housing and a lower housing is set as a center, the upper housing and the lower housing can be rotated.

The upper housing is equipped with a display unit such as an LCD, and a receiver on a front face thereof. On the other hand, the lower housing is equipped with an operation unit on which various sorts of keys are arrayed, and a microphone on a front face thereof, while a circuit board and an antenna are stored in the lower housing. A control unit, a communication unit, and the like are provided on the circuit board, whereas the antenna is connected to the communication unit.

The coupling portion is equipped with a rail provided on a center portion of the front face of the lower housing, and an engaging portion which is engaged with a rail provided on a back face of the upper housing.

This portable telephone is capable of selecting a portable condition under which the upper housing and the lower housing are stacked with each other and an extended condition under which the upper housing and the lower housing are arrayed in a stepped manner along a longitudinal direction by relatively moving the upper housing and the lower housing, while the engaging portion is slid along the rails of the coupling portion.

Then, in the above-described portable terminal, since the operation condition thereof is transferred from the extended condition up to such a swing condition that the upper housing is rotated by an angle of approximately 90 degrees with respect to the lower housing while the engaging portion is set as the center, the display unit having a substantially rectangular shape is orientated whose longer edge is directed along a lateral direction thereof. As a result, for instance, a suitable TV viewing environment may be obtained.

Patent Publication 1: JP-A-2004-320549

DISCLOSURE OF THE INVENTION

Problems that the Invention is to Solve

On the other hand, the above-described portable terminal has the following problems: That is, due to such a structural reason that the engaging portion is engaged with the single rail, a play and the like may be easily produced between the portable condition and the extended condition, and a strength can be hardly secured.

Also, in the portable terminal of the patent publication 1, the operation condition thereof is transferred from the portable condition to the extended condition, and thereafter, the extended condition is transferred to the swing condition. As a result, there are some possibilities that the rail is partially exposed which may damage the good appearance of the portable terminal, and furthermore, since dirt and dusts are entered into the rail, the operations of the coupling portion may be brought into trouble.

The present invention has been made to solve the above-described problems, and therefore, has an object to provide a slide type portable terminal which can suppress a play, and can secure a predetermined strength, while the play may be easily produced between a portable condition and an extended condition of the slide type portable terminal by a coupling portion having a plurality of rails and a plurality of engaging portions, and further, while the respective rails are not exposed under swing condition of the slide type portable terminal.

Means for Solving the Problem

The present invention is featured by a A portable terminal comprising:

an upper housing and a lower housing;

a coupling portion for coupling said upper housing to said lower housing and guiding said first housing and said second housing along a planar direction thereof from a portable condition where said upper housing and said lower housing are stacked with each other to an extended condition where said upper housing and said lower housing are relatively moved; and a swing device for relatively rotating said upper housing and said lower housing about a line along a stacking direction of said upper housing and said lower housing;

wherein said coupling portion comprises:

a first rail and a second rail located in parallel with each other which are provided in one of a back face of said upper housing and a front face of said lower housing; and a first engaging portion and a second engaging portion which are provided on the other of the back face of said upper housing and the front face of said lower housing so as to be engaged with said first rail and said second rail;

an engagement between said first engaging portion and said first rail is releasable under said portable condition; and the first engaging portion which has been released from said first rail is engageable with said second rail by rotating said upper housing and said lower housing relatively about an engaging point between said second engaging portion and said second rail.

In this case, as structures capable of releasing the engagement of the first engaging portion and the first rail, for instance, the below-mentioned structures may be exemplified. That is, one structure may be exemplified in which while an opening portion into and from which the first engaging portion can be inserted and released has been previously formed in the first rail, an opening portion is closed under the portable condition and under the extended condition; and the first engaging portion is embedded into either the back face of the upper housing or the front face of the lower housing through the opening portion opened under the portable condition. Another structure may be exemplified in which while a guide rail which is communicated with both the first rail and the second rail has been previously provided, the guide rail is closed under the portable condition and the extended condition, and the first engaging portion is guided by the guide rail which is opened under the portable condition.

In such a portable terminal, since the first engaging portion and the second engaging portion are engaged with respect to the first rail and the second rail respectively, which are located in parallel to each other, plays and the like can be suppressed, and a predetermined strength can be secured, as compared with those of the conventional stricture in which the engaging portion is engaged with one piece of the rail.

Also, in this portable terminal, since the operation condition is transferred from the portable condition to the swing condition, if the arranging positions of the first rail and the second rail can be properly selected, then the first rail and the second rail can be concealed even under the swing condition.

As a consequence, in this portable terminal, a better outer appearance under the swing condition can be achieved, and also, since there is a small possibility that dirt and dusts are entered into the first rail and the second rail, there is a small risk that an operation problem of the coupling portion caused by the dirt and dusts may occur.

Furthermore, in the above-described portable terminal, since the first engaging portion can be engaged with the second rail under the swing condition, the swing condition can be firmly maintained. As a result, for instance, a superior TV viewing environment can be achieved.

Furthermore, the present invention is featured by that the first rail and the second rail are arranged in an offset mode along a width direction with respect to a center line along a longitudinal direction of one of the upper housing and the lower housing.

In this case, if any one of the first rail and the second rail is arranged in the offset mode along the width direction with respect to the center line, then both the first rail and the second rail may be eventually arranged in the offset mode along the width direction with respect to the center line.

In the above-described portable terminal, since the first rail and the second rail are arranged in the offset mode, and a relative position between the first rail and the second rail, and absolute positions of the first rail and the second rail are properly selected, when the operation condition of the portable terminal is moved from the portable condition to the swing condition, both the first rail and the second rail can be concealed and an exposed area under the swing condition can be increased.

In other words, in this portable terminal, the better outer appearance under the swing condition can be firmly achieved, and further, a functional member can be newly provided in the exposed area under the pivotal condition.

Then, the present invention is featured by that said swing device comprises:
  an opening portion formed in said first rail through which said first engaging portion can be inserted and released;
  a closing member stored in said first rail for closing said opening portion in correspondence with groove width of said first rail; and
  an urging member for urging said first engaging portion along a projection direction; and wherein said closing member is capable of opening said opening portion such that the engagement between said first engaging portion and said first rail is released by moving said closing member along a width direction of said first rail while said closing member brings said first engaging portion embedded, compressing said urging member.

In such a portable terminal, the first engaging portion is embedded through the opening portion formed in the first rail so as to release the engagement of the first engaging portion with respect to the first rail. As previously explained, as a result, a space efficiency is not lowered without giving an adverse influence to the internal space of either the upper housing or the second housing, as compared with such a case that the guide rail has been previously provided between the first rail and the second rail.

Advantage of the Invention

In accordance with the present invention, the plays and the like can be suppressed and also the predetermined strength can be secured by providing the first rail and the second rail in the parallel manner. since the operation condition of the portable terminal is transferred from the portable condition to the swing condition, both the first rail and the second rail are concealed even under the swing condition. As a consequence, the following effects can be achieved: That is, the superior outer appearance can be achieved, and the firm operation of the coupling portion can be realized. Moreover, since the first engaging portion can be engaged with the second rail, the swing condition can be surely maintained.

DESCRIPTION OF REFERENCE NUMERALS AND SIGNS 10, 50 portable terminal
11 upper housing
11B back face
12 lower housing
12A front face
13 display unit
14 receiver
15 first sub-operation unit
20 main operation unit
21 telephone communication-purpose microphone
22 second sub-operation unit
30, 60 coupling portion
31, 61 first rail
32, 62 second rail
33, 63 first engaging portion
33A groove
33B first inclination surface
33C second inclination surface
34, 64 second engaging portion
34A axial portion
34B flange portion
35 opening portion
36 closing portion
36A main body
36B claw portion
36C base portion
36D button portion
36E upper surface 37F inclination surface of base portion
36G upper surface
37 urging member
40, 70 swing device
71 guide rail

BEST MODE FOR CARRYING OUT THE INVENTION

Referring now to drawings, a detailed description is made of embodiments according to the present invention.

Figure 1:
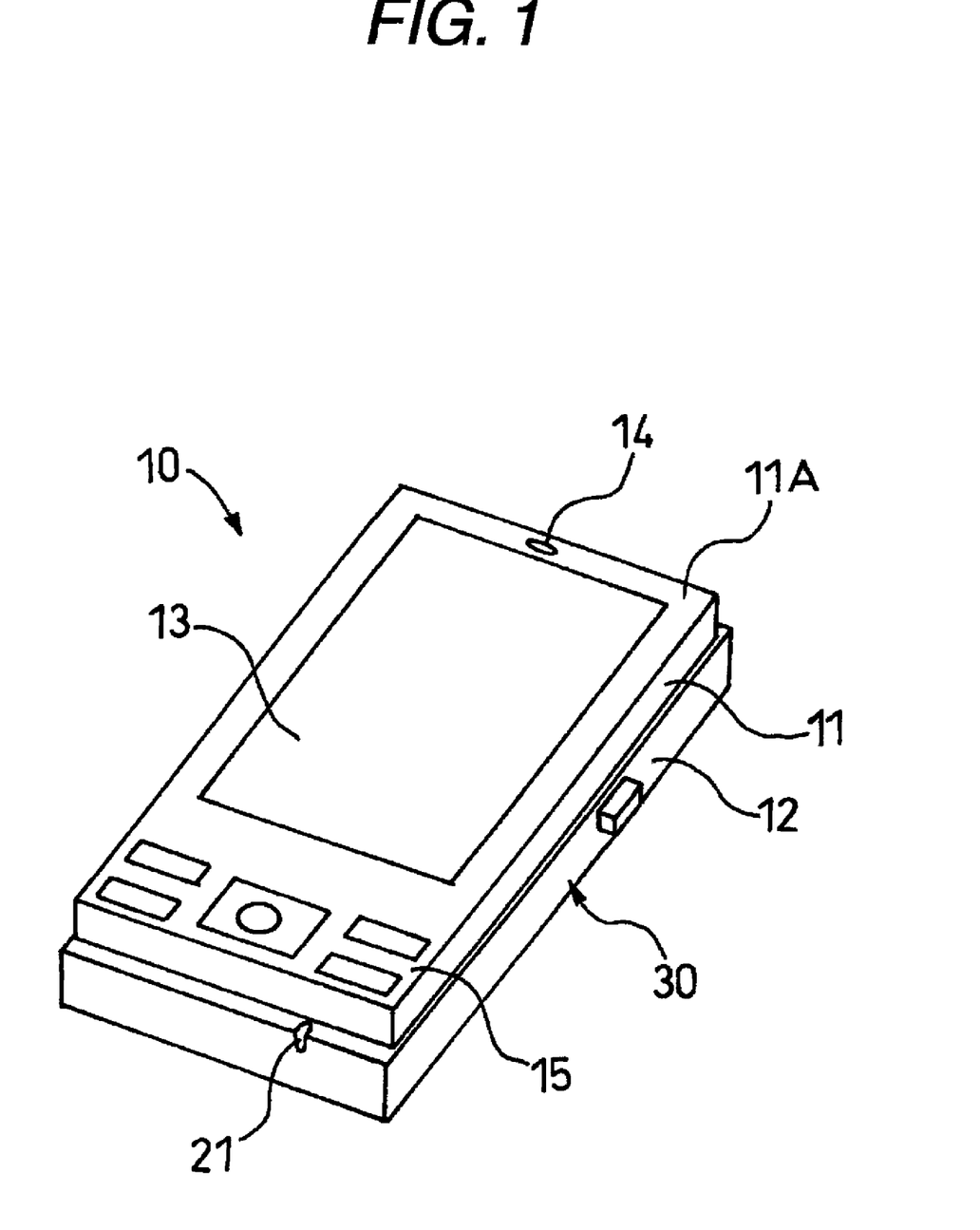
FIG. 1 is an entire perspective view for showing a first embodiment of the present invention.
Figure 2:
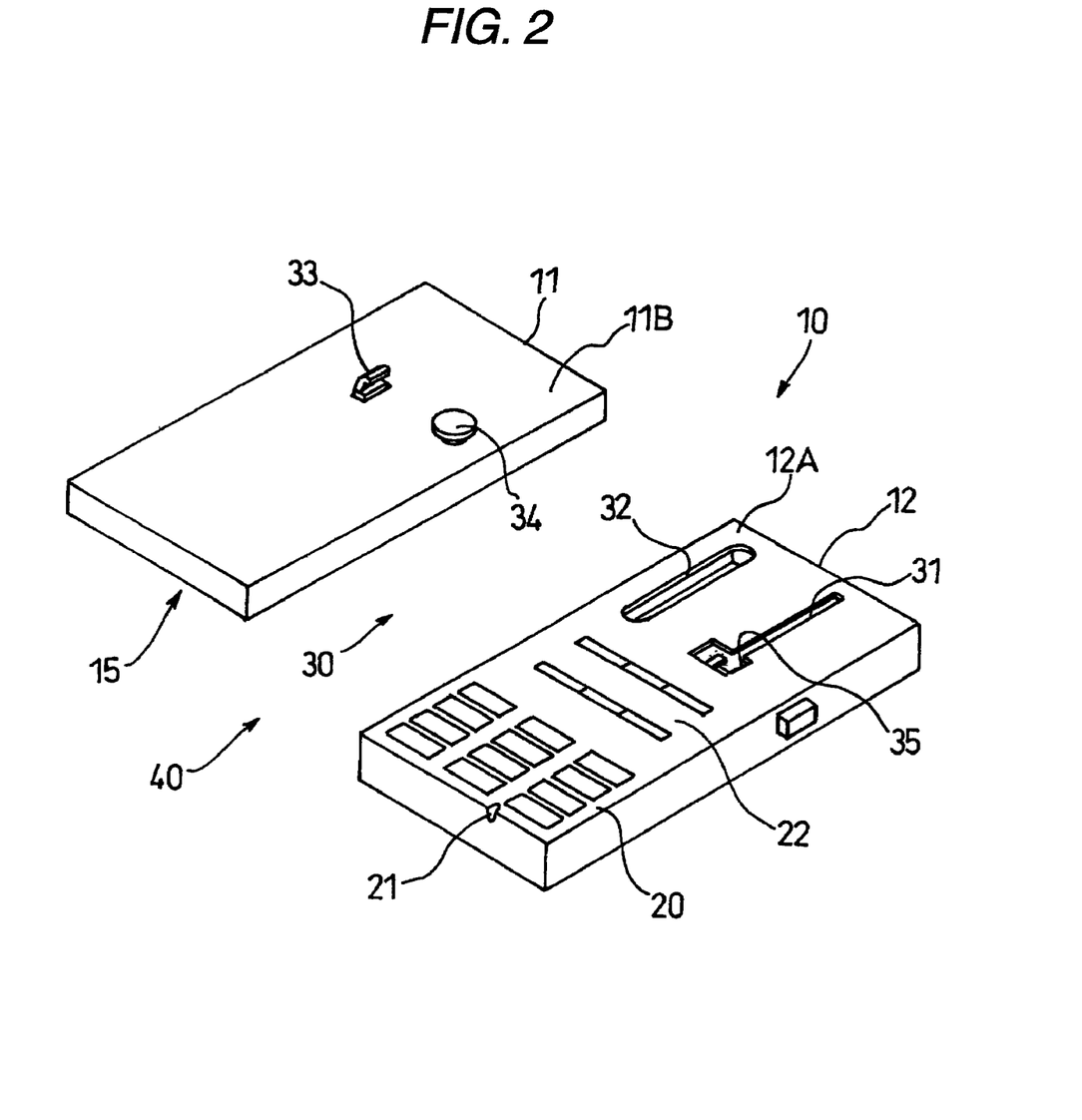
FIG. 2 is an exploded perspective view for indicating a back face of an upper housing and a front face of a lower housing of the first embodiment.
Figure 3:
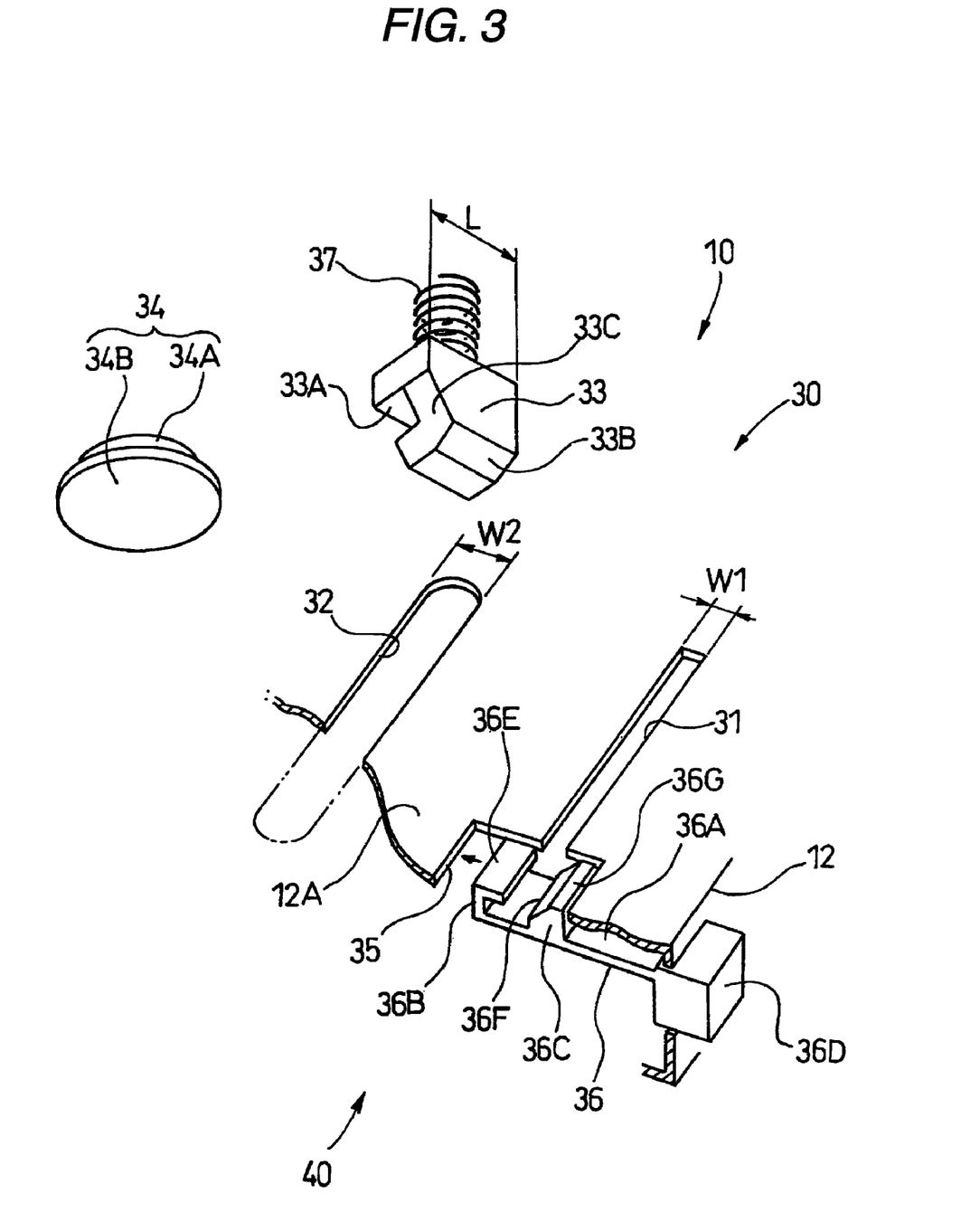
FIG. 3 is a broken-out perspective view for indicating a swing device in the first embodiment.
Figure 4:
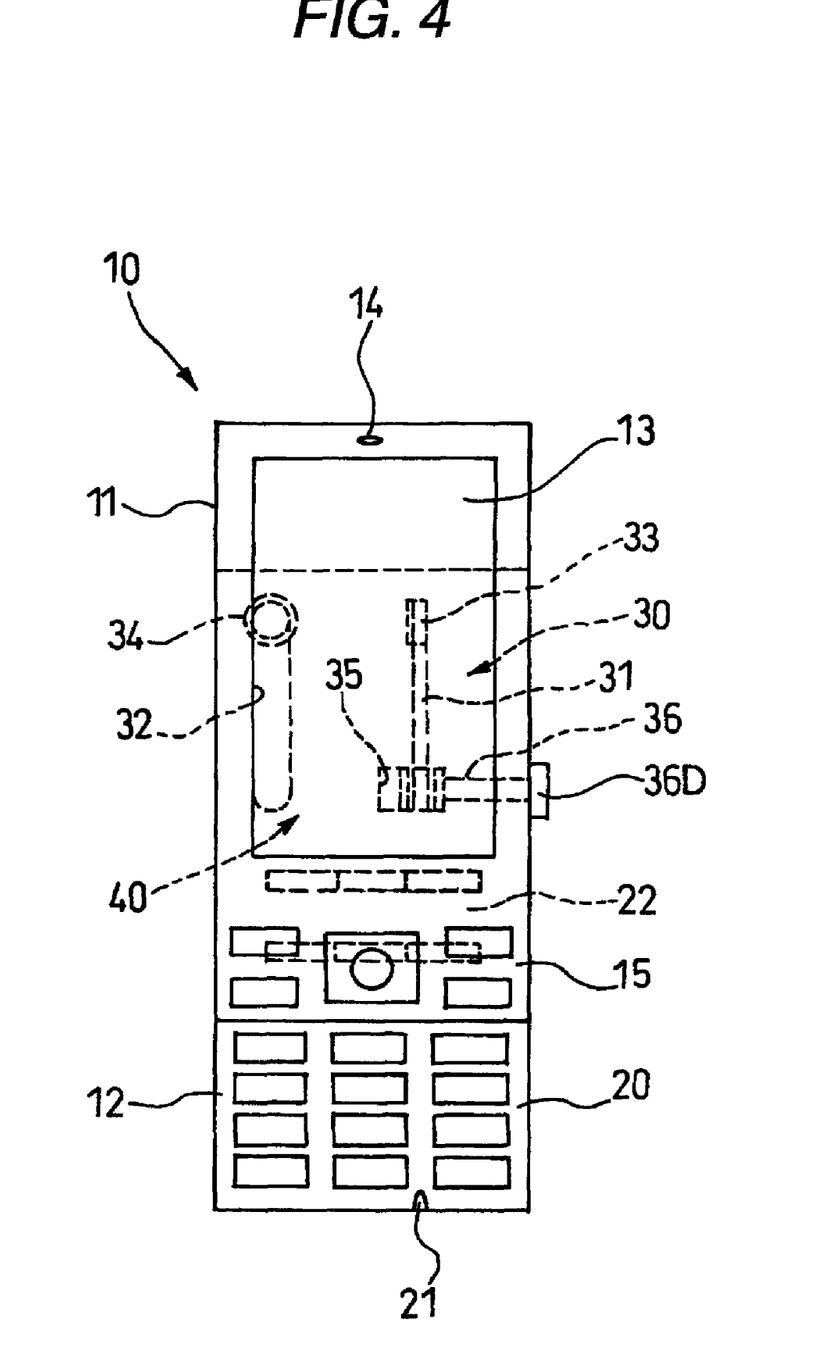
FIG. 4 is a plan view for showing an extended condition in the first embodiment.
Figure 5:
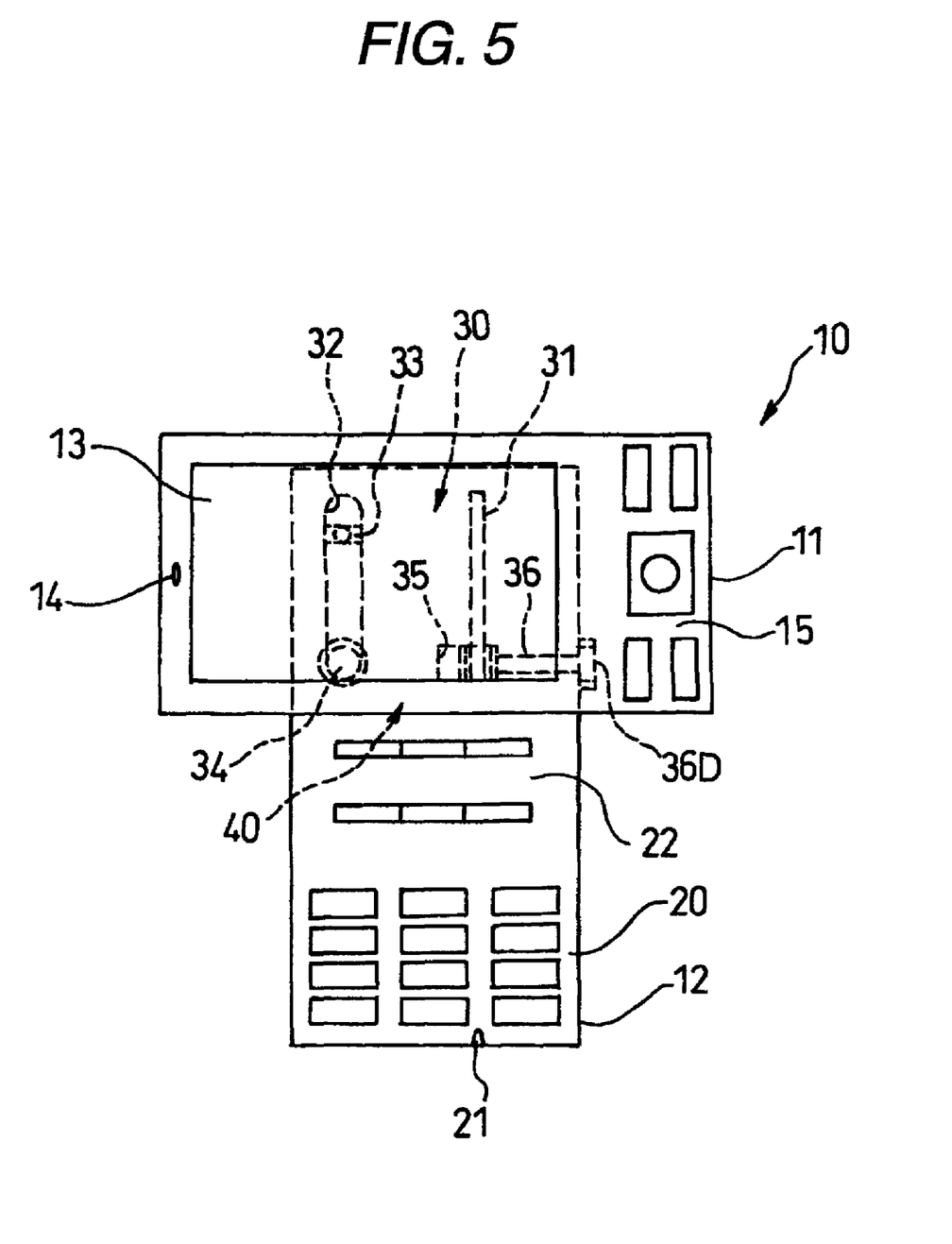
FIG. 5 is a plan view for representing a swing condition in the first embodiment.
Figure 6A:
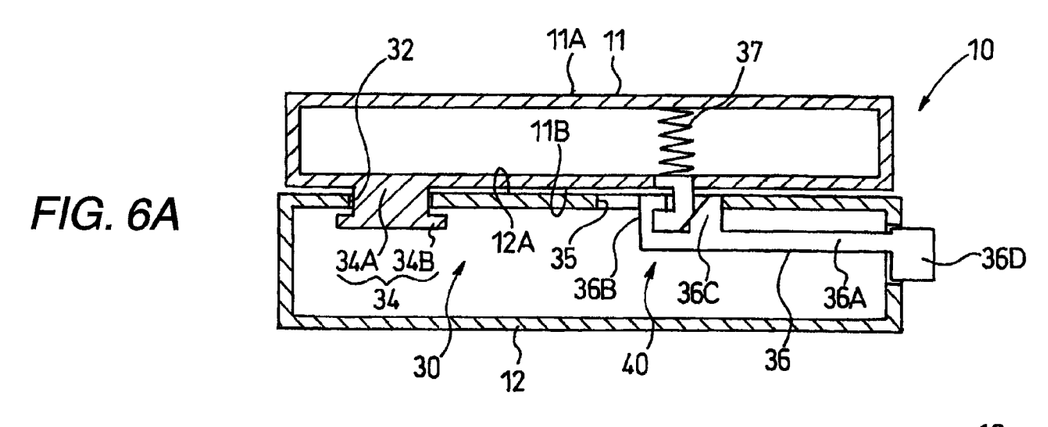
FIGS. 6A and 6B are sectional view for indicating the swing device.
Figure 6B:
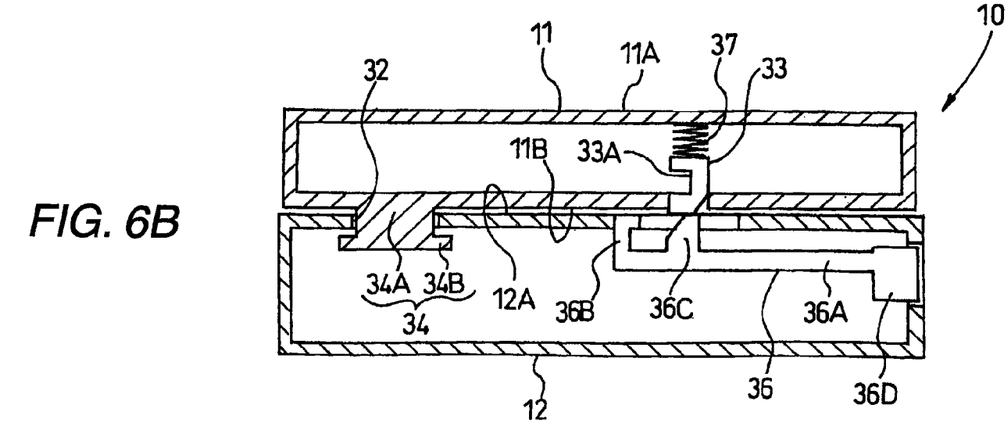
Figure 7:
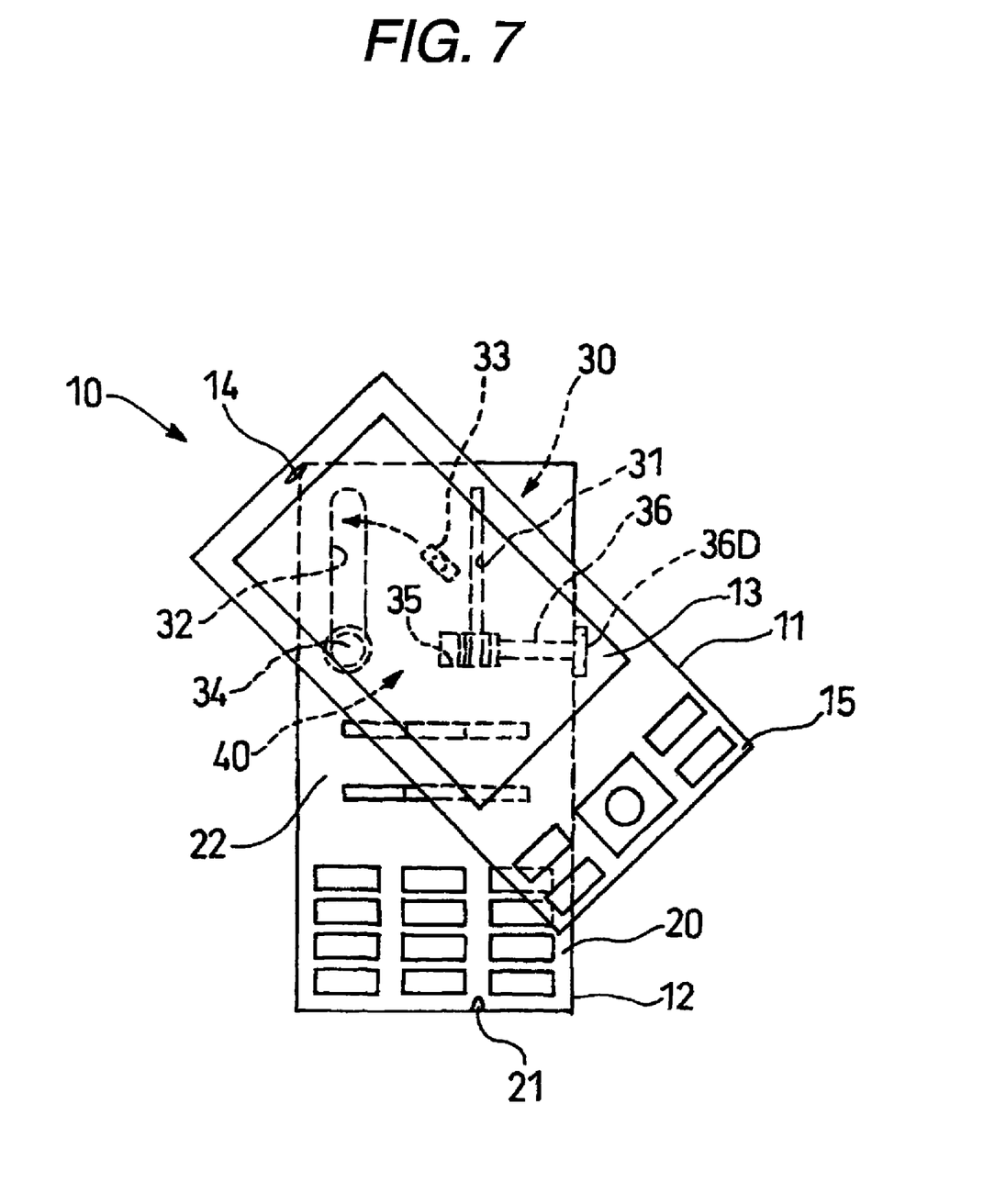
FIG. 7 is a plan view for showing operations of the upper housing and the lower housing until the upper housing and the lower housing are brought into the swing condition.
Figure 8:
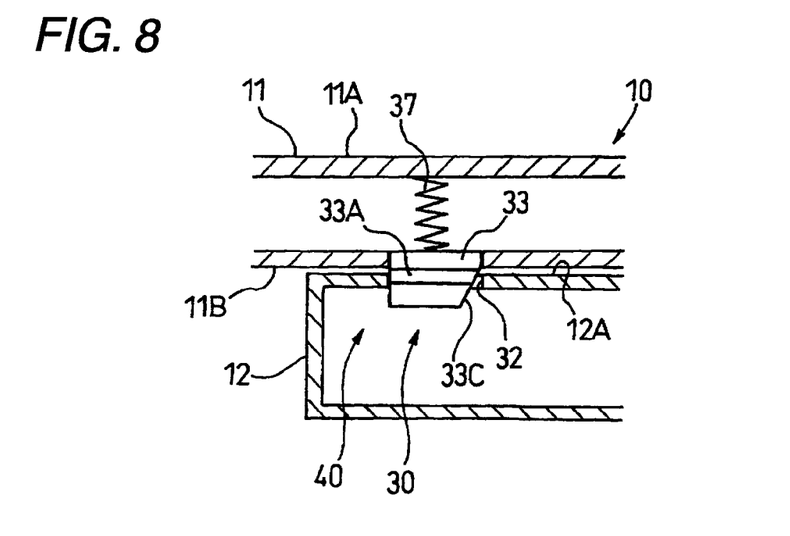
FIG. 8 is a partially enlarged sectional view for indicating a first engaging portion which is engaged with a second rail under the swing condition.

FIG. 1 is an entire perspective view for indicating a first embodiment of the present invention. FIG. 2 is an exploded perspective view for showing a back face of an upper housing and a front face of a lower housing of the first embodiment. FIG. 3 is a broken-out perspective view for indicating a swing device in the first embodiment. FIG. 4 is a plan view for showing an extended condition in the first embodiment. FIG. 5 is a plan view for representing a swing condition in the first embodiment. FIGS. 6A and 6B are sectional views for indicating the swing device. FIG. 7 is a plan view for showing operations of the upper housing and the lower housing until the upper housing and the lower housing are brought into the swing condition. FIG. 8 is a partially enlarged sectional view for indicating a first engaging portion which is engaged with a second rail under the swing condition.

First Embodiment

As indicated in FIG. 1 and FIG. 2, a portable terminal 10 of the first embodiment is provided with an upper housing 11 having a substantially rectangular shape (as viewed in plane), and a lower housing 12 having a substantially rectangular shape (as viewed in plane). The lower housing 12 is coupled via a coupling portion 30 to the upper housing 11.

The upper housing 11 is equipped with a display unit 13 such as an LCD, a receiver 14, and a first sub-operation unit 15 on a front face 11A of the upper housing 11. While the display unit 13 is made in a rectangular shape, the display unit 13 is arranged along a longitudinal direction of the upper housing 11 in such a manner that a long edge of the display unit 13 is directed to the longitudinal direction.

On the other hand, the lower housing 12 is equipped with a main operation unit 20 where various sorts of keys are arrayed; a telephone communication-purpose microphone 21; and a second sub-operation unit 22 on a front face 12A of the lower housing 12. In the lower housing 12, a circuit board where a control unit, a communication unit, and the like are provided, and an antenna connected to the above-described communication unit are stored. It should be understood that the electric circuits such as the control unit and the communication unit are not always mounted on the circuit board installed in the lower housing 12, but may be alternatively mounted on the circuit board installed in the upper housing 11.

As indicated in FIG. 2, the coupling portion 30 is provided with a first rail 31, a second rail 32, which are provided in the front face 12A of the lower housing 12; and a first engaging portion 33 and a second engaging portion 34, which are provided on the back face 11B of the upper housing 11 and are engaged with the first rail 31 and the second rail 32, respectively.

The first rail 31 and the second rail 32 correspond to elongated holes which are formed in the front face 12A of the lower housing 12, and are arranged along the longitudinal direction of the lower housing 12, and also, arranged parallel to each other. These first rail 31 and second rail 32 are arranged in an offset mode along a width direction thereof with respect to a center line along the longitudinal direction of the lower housing 12.

As shown in FIG. 3, while a groove 33A is formed in the first engaging portion 33 along the longitudinal direction, the first engaging portion 33 is made in such a substantially rectangular parallelepiped form that a sectional shape having a substantially U-shape is continued.

On the other hand, the second engaging portion 34 is made in such a substantially circular cylinder with a stepped portion that a flange portion 34B is provided on an edge portion of an axial portion 34A.

In such a portable terminal 10, since the first engaging portion 33 and the second engaging portion 34 are engaged with the first rail 31 and the second rail 33, respectively, the first housing 11 is coupled to the second housing 12; and since the first engaging portion 33 and the second engaging portion 34 are slid along the first rail 31 and the second rail 32 respectively, either a stacked layer condition (namely, condition shown in FIG. 1) or an extended condition (namely condition shown in FIG. 4) can be selected. Under the stacked layer condition, the first housing 11 is stacked on the second housing 12. Under the extended condition, the upper housing 11 and the lower housing 12 are arrayed with a stepped portion along the longitudinal direction.

It should be noted that when the portable terminal 10 is brought into the stacked layer condition and the extended condition, the second sub-operation portion 22 is concealed by the upper housing 11.

Then, as indicated in FIG. 5, in the portable terminal 10 according to the first embodiment, a swing condition can be selected from the portable condition by a swing device 40 constructed based upon the inventive idea of the present invention. Under this swing condition, both the upper housing 11 and the lower housing 12 are relatively rotated, while such a line along the stacked layer direction of the upper housing 11 and the lower housing 12 is defined as a center.

When the swing condition is selected in this portable terminal 10, the portable terminal 10 can display TV broadcasting programs such as ground wave TV broadcast and satellite TV broadcast, and can display still images, and also, can reproduce moving pictures on the display unit 13 arranged in such a manner that the longer edge of this display unit 13 is arranged along a lateral direction thereof. In addition, when the swing condition is selected, the second sub-operation unit 22 is exposed, so that sound volume can be controlled, color hue can be controlled, tuning operation can be performed, and multiplexed broadcasting programs can be selected.

Referring back to FIG. 3, the swing device 40 is equipped with an opening portion 35 having a rectangular shape; a closing member 36 for closing the opening portion 35; and an urging member 37. The opening portion 35 is formed in an edge portion of the first rail 31 on the side of the main operation unit (lower portion in FIG. 3) along the longitudinal direction. The urging member 37 energizes the first engaging portion 33 in such a direction along which the first engaging portion 33 is projected from the back face 11B of the upper housing 11.

The closing member 36 is equipped with a main body 36A, a claw portion 36B, a base portion 36C, and a button portion 36D. The main body 36A is arranged to be intersected with respect to the first rail 31 within the lower housing 12. The claw portion 36B is coupled to a tip portion of the main body 36A in the lower housing 12. The base portion 36C is arranged to be adjacent with respect to the claw portion 36B along the main body 36A. The button portion 36D of the main body 36A is provided outside the lower housing 12. In this case, the closing member 36 is illustrated by constructing the main body 36A, the claw portion 36B, the base portion 36C, and the button portion 36D as an integral component. Alternatively, these individual components may be constructed by employing such materials, and then these individual components may be formed in one body, while considering strengths, outer appearances, and sliding characteristics of these materials.

While the claw portion 36B has an inverse "L"-shape, the claw portion 36B is arranged in such a manner that an upper surface 36E of this claw portion 36B constitutes the same surface as the surface 12A of the lower housing 12. A thicker thickness dimension of the claw portion 36B is made substantially equal to a thicker thickness dimension of the front face 12A of the lower housing 12.

The base portion 36C is arranged in accordance with the below-mentioned manner: That is, an inclination surface 36F of the base portion is provided opposite to the claw portion 36B, and an upper surface 36G thereof constitutes the same surface as the front face 12A of the lower housing 12.

A separation dimension between the claw portion 36B and the base portion 36C corresponds to a width dimension "W1" of the first rail 31.

In such a closing member 36, a tip edge of the claw portion 36B is maintained at a position along an extension line of an opening edge of the first rail 31 by an urging means (not shown), and a stopper, or the like (not shown) provided on the main body 36A.

On the other hand, in the first engaging portion 33, a first inclination surface 33B is provided along as edge line thereof, and second inclination surface 33C is provided on an edge along the longitudinal direction, while a dimension "L" along the longitudinal direction corresponds to a width dimension "W2" of the second rail 32.

Then, the first engaging portion 33 is engaged with the first rail 31 in such a manner that the first inclination surface 33B is directed to such a direction along which the first inclination surface 33B is separated with respect to the second rail 32, and also, the second inclination surface 33C is directed to the side of the main operation unit 20 (namely, lower direction shown in FIG. 3).

Next, a description is made of operations as to the swing device 40 which causes the portable condition of the portable terminal 10 to be transferred to the swing condition thereof.

First of all, as indicated in FIG. 6A, in the portable telephone 10 under portable condition, under such a condition that the closing member 36 is located at an initial position, the first engaging portion 33 is projected from the back face 11B of the upper housing 11 by the urging member 37. As a result, the groove 33A of the first engaging portion 33 is engaged with the claw portion 36B of the closing member 36, and also, the first inclination surface 33B of the first engaging portion 33 has abutted against the base portion inclination surface 36F of the base portion 36C.

Next, as shown in FIG. 6B, since a user operates to push the button portion 36D into the lower housing 12, when the closing member 36 is moved in order that the main body 36A is approached to the second rail 32, the claw portion 36B is extracted from the groove 33A, and also, since the base portion inclination surface 36F depresses the first inclination surface 33B, the first engaging portion 33 is moved toward the upper housing 11. The first engaging portion 33 is embedded while the first engaging portion 33 compresses the engaging means 37 within the upper housing 11, and then, is mounted on the upper surface 36G of the base 36C.

As a result, the engagement of the first engaging portion 33 with respect to the first rail 31 is released.

From this condition, as represented in FIG. 7, while the first engaging portion 33 is slid on the front face 12A of the lower housing 12, the upper housing 11 is rotated in the counter clockwise direction by setting the axial line of the second engaging portion 34 as a center with respect to the lower housing 12.

Then, when a pivotal movement angle of the upper housing 11 with respect to the lower housing 12 is reached to approximately 90 degrees, as shown in FIG. 8, the first engaging portion 33 is projected within the second rail 32 by the urging member 37. As a result, such a swing condition is maintained under which the display unit 13 is orientated whose longer edge is directed to the lateral direction, and the second sub-operation unit 22 is exposed (namely, condition shown in FIG. 5).

In this case, since the first rail 31 and the second rail 32 are arranged in the offset mode, the exposed area on the front face 12A of the lower housing 12 under the swing condition can be increased, so that the second sub-operation unit 22 having superior operability can be installed.

It should also be noted that as shown in FIG. 8, in the portable terminal 10 under swing condition, the second inclination surface 33C of the first engaging portion 33 is faced to the opening edge portion of the second rail 32. As a result, in the case that the swing condition of the portable terminal 10 is transferred to the portable condition, namely in such a case that the upper housing 11 is rotated along the clockwise direction while the axial line of the second engaging portion 34 is set as the center with respect to the lower housing 12, if the user rotates the upper housing 11 manner with force having a strength higher than, or equal to constant force, then the first engaging portion 33 is embedded into the upper housing 11 while the first engaging portion 33 compresses the urging member 37 by the second inclination surface 33c which abuts against the opening edge portion of the second rail 32, and while the first engaging portion 33 is slid on the front face 12A of the lower housing 12, the upper housing 11 can be rotated with respect to the lower housing 12.

As previously described, in accordance with the portable terminal 10 of the first embodiment, the first engaging portion 33 and the second engaging portion 34 are engaged with respect to the first rail 31 and the second rail 32 respectively, which are located parallel to each other. As a consequence, plays and the like can be suppressed, and a predetermined strength can be secured, as compared with those of the conventional stricture in which the engaging portion is engaged with one piece of the rail.

Also, in accordance with the above-described portable telephone 10, the first rail 31 and the second rail 32 are concealed under the portable condition, under the extended condition, and under the swing condition. As a result, a superior outer appearance characteristic under the swing condition can be achieved, and also, since there is a small possibility that dirt and dusts are entered into the first rail 31 and the second rail 32, there is a small risk that an operation problem of the coupling portion 30 caused by the dirt and dusts may occur.

Furthermore, in accordance with the portable terminal 10, the first engaging portion 33 can be engaged with the second rail 32 under the swing condition. As a result, the swing condition can be firmly maintained, so that the better TV broadcasting program display environment such as ground wave TV broadcast and satellite TV broadcast, the better still picture display environment, and the superior moving picture reproducing environment can be achieved.

Also, in accordance with the above-described portable terminal 10, since the first rail 31 and the second rail 32 are arranged in the offset mode, when the operation condition of the portable terminal 10 is moved from the portable conditions to the swing condition, both the first rail 31 and the second rail 32 can be concealed, and the exposed area of the front face 12A of the lower housing 12 under the swing condition can be increased, so that the second sub-operation unit 22 having the superior operability can be installed.

Then, in accordance with the above-described portable terminal 10, the first engaging portion 68 is embedded into the upper housing 11 via the opening portion 35 formed in the first rail 31 so as to release the engagement of the first engaging portion 33 with respect to the first rail 31. As a result, a space efficiency is not lowered without giving an adverse influence to the internal space of the upper housing 11.

It should also be noted that this first embodiment has mainly described that the structural elements are rotated along the counterclockwise direction. Alternatively, since the structural elements are arranged in a symmetrical manner between a right side and a left side, these structural elements may be rotated along the clockwise direction. Also, in the first embodiment, when the push-button type mechanism closing member is released, even any other mechanisms than the push button type mechanism closing member may be alternatively realized, for instance, may be alternatively realized by a slide type releasing mechanism.

Second Embodiment

Next, a description is made of a second embodiment according to the present invention.

It should be understood that in the below-mentioned second embodiment, since either the same reference numerals or the similar reference numerals will be employed as those for denoting the members which have been previously explained in the first embodiment, the descriptions as to these members will be made simple, or will be omitted.

Figure 9:
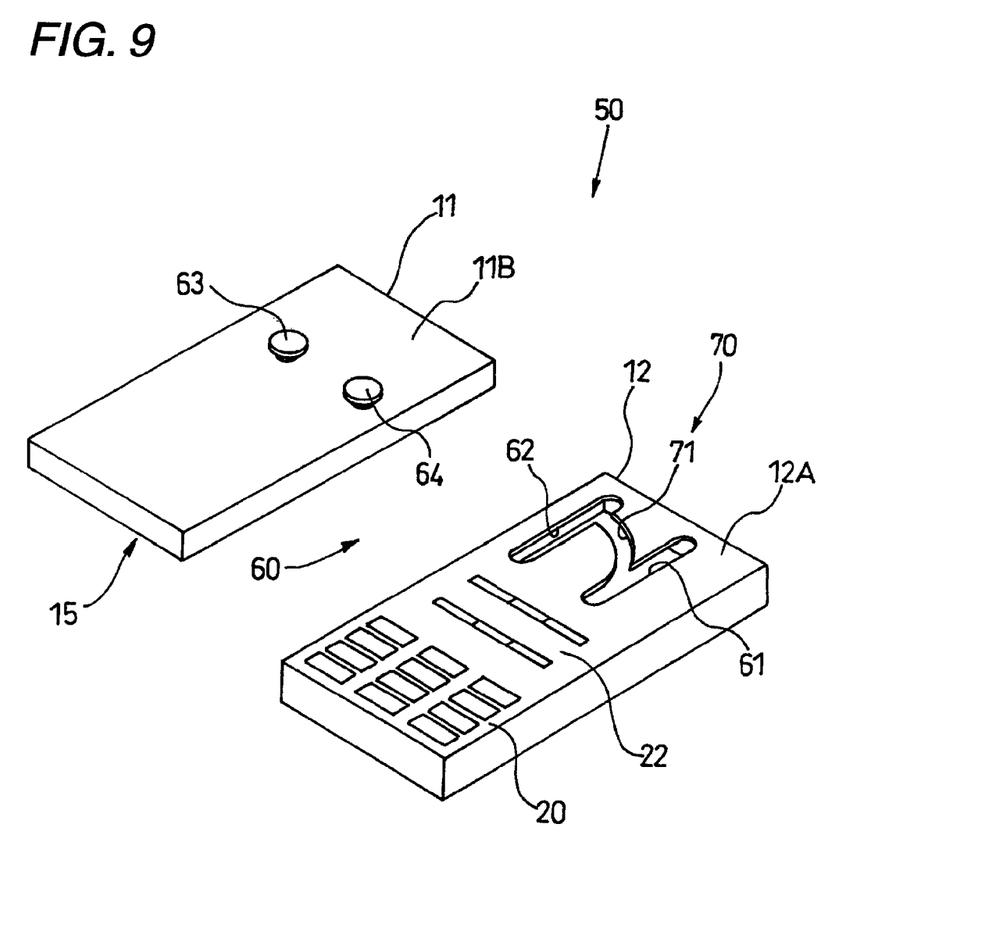
FIG. 9 is an exploded perspective view for indicating a back face of an upper housing and a front face of a lower housing in a second embodiment of the present invention.

In a portable terminal 50 of the second embodiment shown in FIG. 9, both a first rail 61 and a second rail 62 have the same shapes and the same dimensions, which constitute a coupling portion 60, whereas both a first engaging portion 63 and a second engage portion 64 have the same shapes and the same dimensions of circular cylinders with stepped portions.

The first rail 61 and the second rail 62 are arranged on the front face 12A of the lower housing 12 in an offset mode.

Then, as a swing device 70 provided in the portable terminal 50, a guide rail 71 is provided which is communicated to the first rail 61 and the second rail 62.

The guide rail 71 is formed in an arc shape while an edge portion in the second rail 62 on the side of the main operation unit 20. An edge portion in the first rail 61 on the side of the main operation unit 20 is communicated with an edge portion in the second rail 62 on such a side apart from the main operation unit 20.

In such a case that the operation condition of the portable terminal 50 is transferred from the portable condition to the swing condition, the first engaging portion 63 is guided from the first rail 61 via the guide rail 71 to the second rail 62.

In accordance with such a portable terminal 50, this portable terminal 50 has basically contained a similar structure to that of the above-described portable terminal 10 according to the first embodiment As a consequence, plays and the like of the coupling portion 68 can be suppressed, and a predetermined strength can be secured; superior outer appearance characteristics under the swing condition, under the portable condition, and under the extended condition can be achieved; and also, since there is a small possibility that dirt and dusts are entered, such a similar effect can be achieved that there is a small risk that an operation problem of the coupling portion 60 caused by the dirt and dusts may occur.

Then, in accordance with the portable terminal 50 of the second embodiment, while the adverse influence is not given to the internal structure of the upper housing 11 and the adverse influence given to the internal structure of the lower housing 12 is also suppressed to the minimum level, the swing device 70 can be accomplished. As a consequence, the internal spaces of both the upper housing 11 and the lower hosing 12 can be effectively utilized.

The present patent application has been filed on the basis of claiming Japanese Patent Application (JP-A-2005-370614) filed on Dec. 25, 2005, the contents of which are incorporated herewith as references.

INDUSTRIAL APPLICABILITY

The present invention is suitably applied to such a portable terminal. That is, since an upper housing and a lower housing stacked on the upper housing are relatively moved along a planar direction thereof, the portable terminal is brought into an extended condition; and also, since the upper hosing and the lower housing are relatively rotated while a line along a stacking direction is defined as a center, the portable terminal is brought into a swing condition.

The invention claimed is:

1. A portable terminal comprising:
   an upper housing and a lower housing;
   a coupling portion for coupling said upper housing to said lower housing and guiding said first housing and said second housing along a planar direction thereof from a portable condition where said upper housing and said lower housing are stacked with each other to an extended condition where said upper housing and said lower housing are relatively moved; and
   a swing device for relatively rotating said upper housing and said lower housing about a line along a stacking direction of said upper housing and said lower housing;
   wherein said coupling portion comprises:
   a first rail and a second rail located in parallel with each other which are provided in one of a back face of said upper housing and a front face of said lower housing; and
   a first engaging portion and a second engaging portion which are provided on the other of the back face of said upper housing and the front face of said lower housing so as to be engaged with said first rail and said second rail;
   an engagement between said first engaging portion and said first rail is releasable under said portable condition; and
   the first engaging portion which has been released from said first rail is engageable with said second rail by rotating said upper housing and said lower housing relatively about an engaging point between said second engaging portion and said second rail.

2. A portable terminal as claimed in claim 1, wherein said first rail and said second rail are arranged in an offset mode along a width direction with respect to a center line along a longitudinal direction of one of said upper housing and said lower housing.

3. A portable terminal as claimed in claim 1, wherein said swing device comprises:
   an opening portion formed in said first rail through which said first engaging portion can be inserted and released;
   a closing member stored in said first rail for closing said opening portion in correspondence with a groove width of said first rail; and an urging member for urging said first engaging portion along a projection direction; and wherein said closing member is capable of opening said opening portion such that the engagement between said first engaging portion and said first rail is released by moving said closing member along a width direction of said first rail while said closing member brings said first engaging portion embedded, compressing said urging member.

* * * * *